United States Patent Office 2,892,838
Patented June 30, 1959

2,892,838
PHOTOGRAPHIC SENSITIZING DYES DERIVED FROM 2-ALKYL-6,7-DIHYDRO-4-H-THIOPYRANO(4,3D) THIAZOLE

Robert H. Sprague, East Hampton, Conn., assignor to Sperry Rand Corporation, New York, N.Y., a corporation of Delaware No Drawing. Application August 22, 1955
Serial No. 529,964

14 Claims. (Cl. 260—240.4)

This invention pertains to the preparation of a new thiazole base, 2-alkyl-6,7-dihydro-4-H-thiopyrano (4,3d) thiazole (I), and the synthesis of quaternary salts and photographic sensitizing dyes from it.

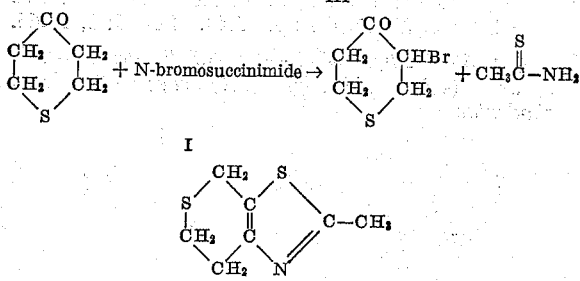

I is prepared by brominating 2,3,5,6-tetrahydro-1-thio-4-pyranone (II) (Barkenbus et al., J. Org. Chem. 16, 232 (1951)), with N-bromosuccinimide and condensing the product (III) with thioacetamide.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 6,7-dihydro-4-H-thiopyrano-(4,3d) thiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes, I employ 2-alkyl-6,7-dihydro-4-H-thiopyrano (4,3d) thiazoles, particularly 2-methyl-6,7-dihydro-4-H-thiopyrano (4,3d) thiazole. I first convert the 2-alkyl-6,7-dihydro-4-H-thiopyrano (4,3d) thiazole base to quaternary salts by reacting the base with esters, such as alkyl halides, alkyl sulfates, or alkyl-p-toluene sulfonates, for example. For purposes of convenience, the quaternary salts useful in practicing this invention can be represented by the following single formula:

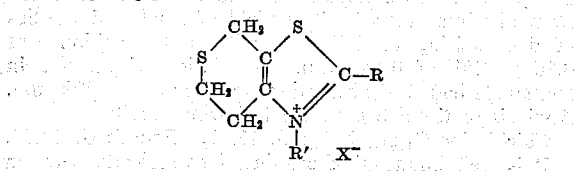

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxy methyl, β-carbomethoxyethyl, β-carbethoxyethyl, allyl, etc. or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, I react the quaternary salts with α-halogenoquinoline quaternary salts, in the presence of an acid binding agent, such for example, as sodium ethylate, sodium carbonate, pyridine or a strong organic base (e.g. triethyl amine, tri-methylamine and N-methyl piperidine). I have found it advantageous to employ a mixture of pyridine with a strong tertiary organic base.

Instead of 2-halogenoquinoline quaternary salts, I can employ 2-alkylmercapto or 2-arylmercaptoquinoline quaternary salts to condense with the quaternary salts of 2-alkyl-6,7-dihydro-4-H-thiopyrano (4,3d) thiazole in the presence of an acid binding agent.

Using 2-halogenopyridine quaternary salts instead of 2-halogenoquinoline quaternary salts, I can prepare pyrido-cyanine dyes containing a 6,7-dihydro-4-H-thiopyrano (4,3d)-thiazole nucleus.

Using 2-alkylmercapto or 2-arylmercaptobenzothiazole or naphthothiazole salts, I can prepare simple cyanine dyes other than pseudocyanine dyes.

To prepare symmetrical carbocyanine dyes from 2-alkyl-6,7-dihydro-4-H-thiopyrano (4,3d) thiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 2-alkyl-6,7-dihydro-4-H-thiopyrano (4,3d) thiazole quaternary salts, I react the quaternary salts with cycloammonium quaternary salts containing a β-arylaminovinyl group in the alpha or gamma position, i.e. in one of the so-called reactive positions in the presence of an acid binding agent, e.g. pyridine or pyridine plus triethyl amine.

To prepare styryl dyes from my new quaternary salts, I condense them with p-dialkyl aminobenzaldehyde in the presence of an alkaline catalyst, e.g. piperidine in absolute ethanol solution.

To prepare merocarbocyanine dyes from 2-alkyl-6,7-dihydro-4-H-thiopyrano (4,3d) thiazole quaternary salts, I condense the quaternary salts with ketomethylene heterocyclic intermediates containing an aryl amino-methylene group in the 5-position in the presence of an acid binding agent, e.g. pyridine plus triethyl amine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented December 14, 1943.

The following examples will serve to demonstrate the manner of preparation of my new bases, quaternary salts and dyes. These examples are not, however, intended to limit my invention.

*Example 1.—2-methyl-6,7-dihydro-4-H-thiopyrano (4,3d) thiazole*

Twenty grams of 2,3,5,6-tetrahydro-1-thio-4-pyranone (Bennet and Scorah, J. Chem. Soc. 1927, 196), 30.5 g.

of N-bromosuccinimide and 50 ml. of dry carbon tetrachloride were gently warmed under reflux on the steam bath until a violent reaction set in. The mixture was chilled in an ice bath, filtered from succinimide and the filtrate was evaporated under water pump vacuum until the CCl₄ was removed. The crude 3-bromo-2,3,5,6-tetrahydro-1-thio-4-pyranone thus obtained is unstable and must be used at once.

The product from the above reaction was diluted with 25 ml. of absolute ethanol, 12 g. of thioacetamide was added and the mixture was kept at 0° C. for 24 hours followed by standing at room temperature for 3 days. The alcohol was distilled off under water pump vacuum and the brown residue was extracted with 3% hydrochloric acid. After extracting the acid solution with ether to remove tarry impurities the solution was made alkaline with NaHCO₃ and the oily base was taken up in ether. The ether solution was dried with anhydrous K₂CO₃, evaporated and the product was distilled under reduced pressure. The product was a pale yellow oil boiling at 125–135° at 8 mm. The yield was 5.0 g., 17% of theoretical.

*Example 2.—3-ethyl-1'-methyl-6',7'-dihydro oxa-4'-H-thiopyrano (4,3d) thiazolocarbocyanine iodide*

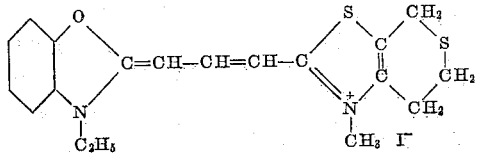

A mixture of 1.5 g. of 2-methyl-6,7-dihydro-4-H-thiopyrano (4,3d) thiazole and 1.8 g. of methyl para toluene sulfonate was heated on the steam bath for 10 minutes. The viscous brown quaternary salt thus formed was mixed with 3.8 g. of 2-beta acetanilidovinyl benzoxazole ethiodide, 1.0 g. of triethylamine and 15 ml. of pyridine and the solution was refluxed for 2 minutes with shaking. The intense red solution was chilled, diluted with ether and the solvent decanted from the sticky dye precipitate. The dye was stirred with water until crystalline, collected on a filter, washed on the filter with absolute ethanol and dried. After recrystallization from absolute ethanol the dye was obtained as dark red crystals melting with decomposition at 240–242° C. The yield was 0.4 g., 10% of theoretical. A solution of the dye in methanol has an absorption maximum at 516 mu.

*Example 3.—1,1'-dimethyl bis(6,7-dihydro-4-H-thiopyrano (4,3d) thiazolocarbocyanine iodide*

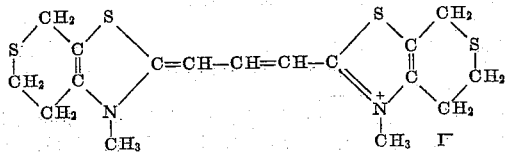

A mixture of 1.7 g. of 2-methyl-6,7-dihydro-4-H-thiopyrano (4,3d) thiazole and 2.0 g. of methyl paratoluene sulfonate were heated on the steam bath for 10 minutes. The product was dissolved in a mixture of 10 ml. of pyridine, 0.5 g. of triethylamine and 4.5 g. of triethyl orthoformate and the solution was refluxed for 30 minutes. The purple solution was poured into 200 ml. of 5% sodium iodide solution, the water was decanted from the sticky precipitate and the product was stirred with acetone until crystalline. The dye was filtered, washed on the filter with acetone and water and recrystallized from methanol. The yield of dark green crystals of dye melting at 192–194° with decomposition was 0.3 g., 12% of theoretical. A solution of the dye in methanol has an absorption maximum at 566 mu.

*Example 4.—1,1'-diethyl bis(6,7-dihydro-4-H-thiopyrano (4,3d) thiazolocarbocyanine iodide*

This dye was prepared in the same manner as Example 3 from 2-methyl-6,7-dihydro-4-H-thiopyrano thiazole etho-ethyl sulfate. The dye was obtained in the form of coppery crystals which melted with decomposition at 215°. The dye has an absorption maximum in methanol solution at 570 mu.

*Example 5.—1',3-diethyl-6',7'-dihydro-4'-H-oxathiopyrano (4,3d) thiazolocarbocyanine iodide*

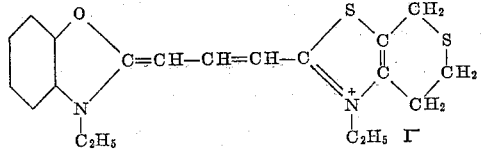

This dye was prepared in the same manner as Example 1, from the corresponding N-Ethyl reactants. The yield of garnet red needles with metallic reflex was 7%. The dye melted at 196–198° with decomposition. A solution of the dye in methanol had an absorption maximum at 518 mu. Analysis of the dye gave the following results.

Calc'd. for $C_{20}H_{23}IN_2OS_2$: I, 25.48. Found: I, 25.66.

*Example 6.—3-ethyl-5-[(1-ethyl-6,7-dihydro-4-H-thiopyrano (4,3d) thiazolyl (1,2)idene) ethylidene] rhodanine*

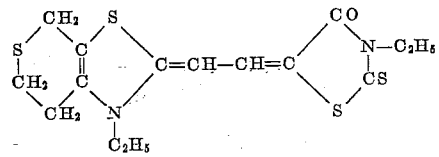

A mixture of 1.0 g. of 2-methyl-6,7-dihydro-4-H-thiopyrano (4,3d) thiazole and 1.3 g. of ethyl paratoluene sulfonate was heated on the steam bath for one hour. The viscous brown product was mixed with 10 ml. of pyridine, 1.7 g. of 5-acetanilidomethylene-3-ethyl rhodanine and 0.6 g. of triethylamine and the solution was refluxed for 30 minutes. The dye was precipitated with water, filtered and recrystallized from methanol. The product was obtained in the form of dark red crystals with a blue reflex. The yield of dye melting at 232–233° with decomposition was 2½% of theoretical. A solution of the dye in methanol had an absorption maximum at 544 mu.

*Example 7.—2-paradimethyl aminostyryl-6,7-dihydro-4-H-thiopyrano (4,3d) thiazole ethiodide*

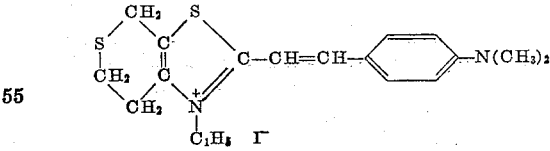

A mixture of 1.3 g. of 2-methyl-6,7-dihydro-4-H-thiopyrano (4,3d) thiazole and 2.0 g. of diethylsulfate was heated at 100° for 1 hour. The product was mixed with 1.5 g. of p-dimethylaminobenzaldehyde, 15 ml. of absolute ethanol and 3 drops of piperidine and the solution was refluxed for 30 minutes. The mixture was poured into aqueous sodium iodide solution and the precipitated dye was stirred with acetone until crystalline. The product was collected on a filter and recrystallized from absolute ethanol. The yield of small red needles of dye melting at 247–249° with decomposition was 0.16 g., 4% of theoretical. A solution of the dye in methanol had an absorption maximum at 490 mu. Analysis of the dye gave the following results.

Calc'd, for $C_{18}H_{23}IN_2S_2$: S, 13.99. Found: S, 13.78.

It is well known that cyanine dyes resonate between two extreme forms and that a cyanine dye can be represented by either of the two extreme forms. Thus, the unsymmetrical type of instant dyes can be represented by either of the following formulas:

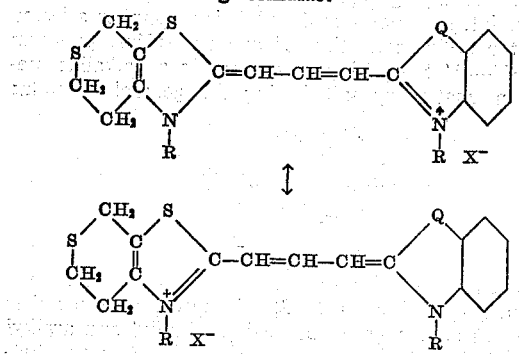

The features of novelty which I believe to be characteristic of my invention are set forth with particularity in the following claims. It should be understood, however, that modifications and changes may be made, without departing from the spirit and substance of my invention, as will be apparent to those skilled in the art.

I claim:

1. A dye selected from the group characterized by the following general formula:

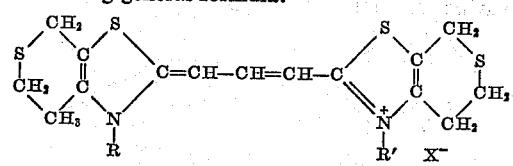

where R and R' respectively represent members selected from the group consisting of alkyl and aralkyl groups and X⁻ represents an anion.

2. 1,1' - dimethyl bis (6,7-dihydro-4-H-thiopyrano (4,3d) thiazolocarbocyanine iodide having the following structure:

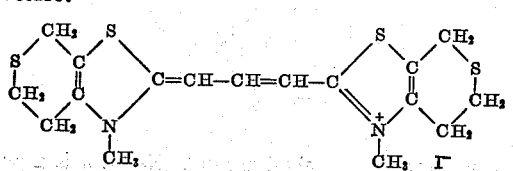

3. 1,1'-diethyl bis (6,7-dihydro-4-H-thiopyrano (4,3d) thiazolo carbocyanine iodide.

4. A dye selected from the group characterized by the following general formula:

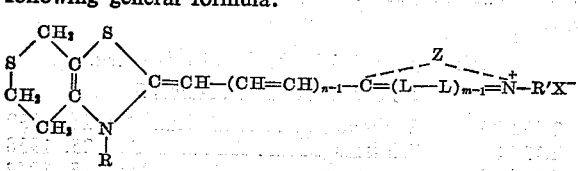

where R and R' respectively represent members selected from the group consisting of alkyl and aralkyl groups, $n$ represents a positive integer from one to three, L represents a methine group, X⁻ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series, and $m$ represents a positive integer from one to two.

5. 3-ethyl-1'-methyl-6',7'-dihydro oxa-4'-H-thiopyrano (4,3d) thiazolocarbocyanine iodide having the structure:

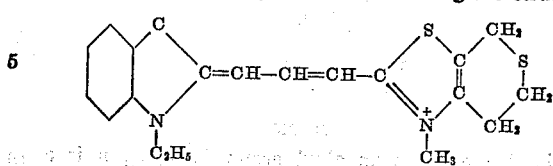

6. 1',3-diethyl-6',7'-dihydro oxa-4' - H - thiopyrano (4,3d) thiazolocarbocyanine iodide.

7. A dye selected from the group characterized by the following general formula:

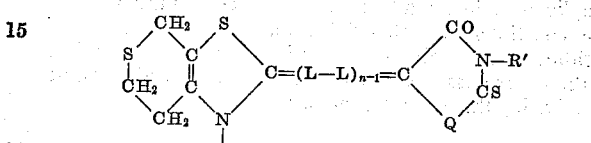

where R represents a member selected from the group consisting of alkyl and aralkyl groups, R' represents a member selected from the group consisting of alkyl, aralkyl and aryl groups, L is a methine group, $n$ is a positive integer from one to four and Q is a member selected from the group consisting of oxygen, sulfur, selenium and =N—R'.

8. 3-ethyl - 5 - [(1-ethyl-6,7-dihydro-4-H-thiopyrano (4,3d) thiazolyl (1,2) idene) ethylidene] rhodanine having the following structure:

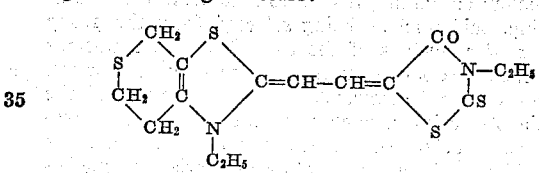

9. A dye selected from the group characterized by the following general formula:

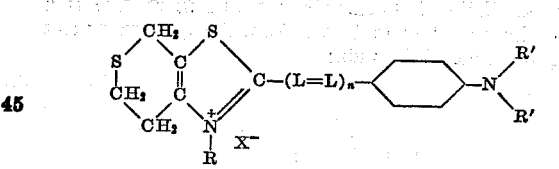

where R and R' respectively represent a member selected from the group consisting of alkyl and aralkyl groups, L represents a methine group, $n$ is a positive integer from one to two and X⁻ represents an anion.

10. 2 - paradimethylaminostyryl-6,7-dihydro-4-H-thiopyrano (4,3d) thiazole ethiodide having the following structure:

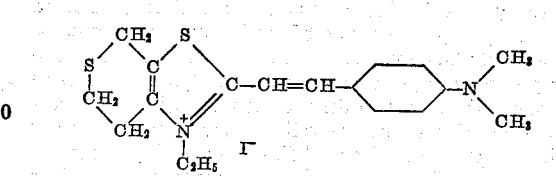

11. A process for preparing symmetrical carbocyanine dyes having the general formula:

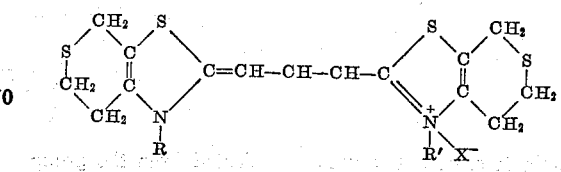

wherein R and R' respectively represent members selected from the group consisting of alkyl and aralkyl groups and X⁻ represents an anion from a quaternary salt having the general formula:

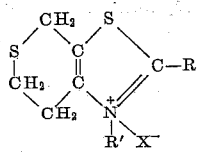

wherein R represents an alkyl group $C_nH_{2n+1}$, $n$ is a positive integer of from 1 to 3, R' represents a member selected from the group consisting of alkyl and aralkyl groups and X⁻ represents an anion comprising condensing the quaternary salt with an ester of an orthocarboxylic acid in an alkaline medium containing at least one constituent selected from the group consisting of pyridine and a mixture of pyridine and triethylamine.

12. A process for preparing unsymmetrical cyanine dyes having the general formula:

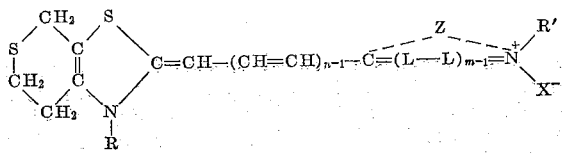

where R and R' respectively represent members selected from the group consisting of alkyl and aralkyl groups, $n$ represents a positive integer from 1 to 3, L represents a methine group, X⁻ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series and a nucleus of the 3,3-dialkyl indolenine series, and $m$ represents a positive integer of from 1 to 2 from the quaternary salt having the general formula:

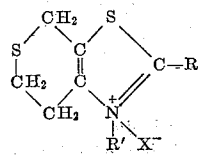

wherein R represents an alkyl group $C_nH_{2n+1}$, $n$ is a positive integer of from 1 to 3, R' represents a member selected from the group consisting of alkyl and aralkyl groups and X⁻ represents an anion comprising condensing said quaternary salt with a heterocyclic ammonium quaternary salt having a reactive constituent selected from the group consisting of aryl aminovinyl groups, aryl aminobutadienyl groups, halogen atoms and thioether groups in a position selected the alpha and gamma positions with respect to the nitrogen atom in the heterocyclic ring of said heterocyclic ammonium quaternary salt in the presence of an alkaline condensing agent.

13. A process for preparing merocarbocyanine dyes containing the 6,7-dihydro-4-H-thiopyrano (4,3d) thiazole nucleus and having the general formula:

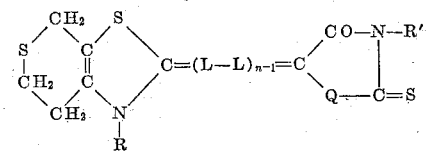

wherein R represents a member selected from the group consisting of alkyl and aralkyl groups, R' represents a member selected from the group consisting of alkyl, aralkyl and aryl groups, L is a methine group, $n$ is a positive integer from 1 to 4 and Q is a member selected from the group consisting of oxygen, sulfur, selenium and =N—R' comprising condensing in an alkaline medium, a quaternary salt having the general formula:

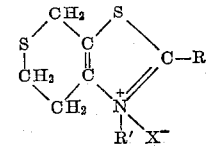

where R represents an alkyl group $C_nH_{2n+1}$, $n$ is a positive integer of from 1 to 3, R' represents a member selected from the group consisting of alkyl and aralkyl groups and X⁻ represents an anion with a ketomethylene heterocyclic compound having the ketomethylene heterocyclic ring of said mercarbocyanine dye and having a reactive arylaminomethylene group in the 5-position with respect to the member represented by Q in the depicted general formula for said merocarbocyanine dye in an alkaline medium.

14. A process for preparing styryl dyes containing the 6,7-dihydro-4-H-thiopyrano (4,3d) thiazole nucleus and having the general formula:

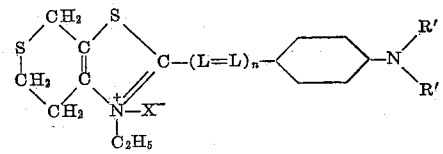

where R and R' respectively represent a member selected from the group consisting of alkyl and aralkyl groups, L represents a methine group, $n$ is a positive integer from 1 to 2 and X⁻ represents an anion comprising condensing a quaternary salt having the general formula:

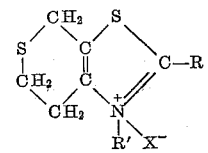

where R represents an alkyl group $C_nH_{2n+1}$, $n$ is a positive integer of from 1 to 3, R' represents a member selected from the group consisting of alkyl and aralkyl groups and X⁻ represents an acid radical with p-dialkyl aminobenzaldehyde in the presence of an alkaline catalyst.

References Cited in the file of this patent
UNITED STATES PATENTS

| | | |
|---|---|---|
| 2,133,969 | Buchman | Oct. 25, 1938 |
| 2,134,015 | Williams | Oct. 25, 1938 |
| 2,304,981 | Wilmanns | Dec. 15, 1942 |
| 2,320,654 | Riester | June 1, 1943 |
| 2,336,463 | Brooker et al. | Dec. 14, 1943 |
| 2,336,843 | Brooker et al. | Dec. 14, 1943 |
| 2,338,782 | Riester | Jan. 11, 1944 |
| 2,409,612 | Brooker | Oct. 22, 1946 |
| 2,423,217 | Anish et al. | July 1, 1947 |

OTHER REFERENCES

Chemical Abstracts 16, 3101. (Abstract of Brit. Med. Journal, 1922 I, 514–5). (Copy in Sci. Libr.)

Chemical Abstracts 19, 530. (Copy in Sci. Libr.) (Abstract of Proc. Roy. Soc., London, 96B 317–333, 1924.)

Clerc: "Photography Theory and Practice," 3rd ed., page 151, Pitman Pub. Corp., N.Y. 1942. (Copy in Div. 60.)